Aug. 25, 1959  L. GOLDMAN, JR  2,901,680
FEEDBACK CIRCUITS FOR SERVO APPLICATIONS
Filed Oct. 18, 1956

INVENTOR.
LEMAN GOLDMAN, JR.
BY
ATTORNEYS

United States Patent Office 2,901,680
Patented Aug. 25, 1959

2,901,680

FEEDBACK CIRCUITS FOR SERVO APPLICATIONS

Leman Goldman, Jr., Pennsauken, N.J., assignor, by mesne assignments, to the United States of America as represented by the Secretary of the Navy Application October 18, 1956, Serial No. 616,897

4 Claims. (Cl. 318—28)

This invention relates to feedback circuits of servo control systems and more particularly to a feedback circuit with an amplitude limiter therein obtaining high acceleration of correction at large error signals in the servo control system with little or no detriment to the smaller error signals.

A number of feedback circuits for servo control systems, telemetering systems, or servo follow-up systems are well known utilizing a pilot generator, tachometer generator, or the like, to produce voltages fed back to the servo system amplifier for stabilizing and improving the response of the servo control system. The limited error input amplifier was a necessary result of the original servo amplifier. When this input amplifier limits as a result of large amplitudes and/or high rate of input motion, the servo system responds slowly without the feedback limiter because the feedback signal continues to oppose the output motion. However, with the feedback limiter limiting the amplitude of the feedback voltage to the mixer stage to less than that of the amplitude of the error voltage signal of the same stage, more direct signal of the error signal voltage reaches the servo motor and gives higher acceleration.

In the present invention the feedback voltages are limited in amplitude below the amplitude of the error signal voltages so that the error signal voltages are always predominant in the amplifier circuit controlling the servo motor to produce good acceleration response in the control of this servo motor to null the error signal voltage. The fed back output voltages, usually produced by a pilot generator or tachometer generating means, are passed through a high-pass filter for filtering out low frequencies to a limiter in order that the limiter may only limit the amplitude of high frequency fed back voltages. While this invention is particularly illustrated by reference to a servo control system, telemetering device, or the like, it is to be understood that it may be utilized in any closed loop amplifying means to improve the amplifying signal response in a closed loop correction system. It is therefore a general object of this invention to provide a limiting means in the feedback network for an amplifier circuit, which amplifier circuit is in a corrective follow-up system.

These and other objects, advantages, features, and uses may become more apparent as the description proceeds when considered along with the accompanying drawing in which.

Figure 1:
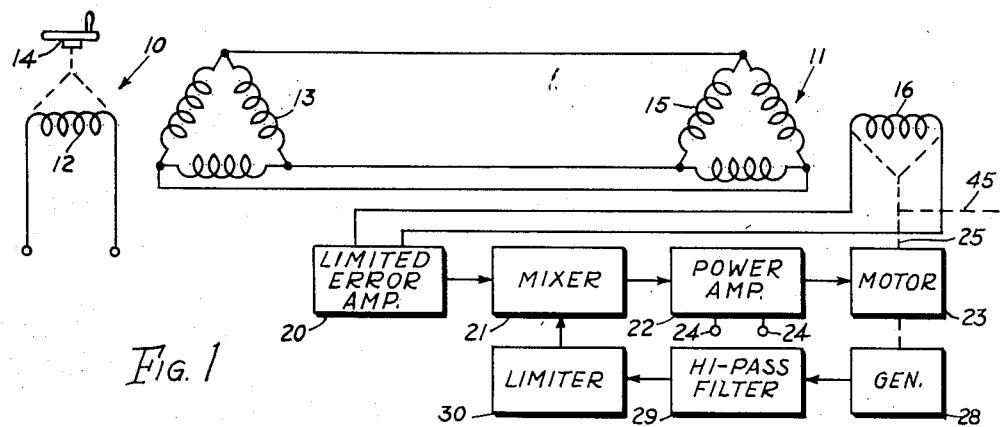
Figure 1 is a partial schematic and partial block circuit diagram illustrating the invention in a servo control system.

Referring more particularly to Figure 1, there is illustrated a generally understood servomechanism having a transmitter station shown at 10 and a receiver station shown at 11. The transmitter may consist of a rotor winding 12 energized by an alternating current which rotor may be mechanically rotated with respect to stator windings 13 by any desirable means, herein shown as a handwheel 14 merely for the purpose of illustration. It is to be understood that the rotor winding 12 may be mechanically rotated by a gun mount, sight unit, or any device whereby it may be desirable to transmit the rotative angle information to a remote point. The angular rotation of the rotor winding 12 is transmitted through the stator windings 13 to the stator windings 15 at the receiver station, the rotative angle being picked up in the rotor receiver winding 16, as is well understood in the art. If the receiver rotor winding 16 is not in correspondence with the angle established by transmitter rotor 12, a voltage signal will be induced in the receiver rotor winding 16 which will hereinafter be referred to as the error signal voltage or voltages. The receiver rotor winding 16 is coupled to a limited error amplifier 20 for limiting and amplifying the error signal voltages appearing in the rotor 16. The amplified error signal voltages are coupled to a mixer 21, the output of which mixer controls a power amplifier 22 supplying a control voltage to a servo motor 23, the supply voltage for the servo motor 23 being introduced at the terminals 24. The servo motor is mechanically coupled through a driving means 25 to the receiver rotor winding 16 to rotate this winding in a manner well understood in the art. Any error voltage appearing in the receiver rotor winding 16 will therefore pass through the elements 20 and 21 to control the direction and magnitude of the supply voltage to the servo motor 23 by the power amplifier 22 to rotate the receiver rotor winding 16 in a manner to reduce the error voltage to zero. In order to minimize over travel and to eliminate hunting of the servo system, feedback circuits are necessary to reduce the servo motor speed as it approaches the null position. It is a generally understood practice to couple a voltage generator, as shown at 28, which is mechanically driven by the servo motor 23. The generator 28 is often referred to as a pilot generator or tachometer generator and may be of a type to produce either alternating current voltages or direct current voltages, as desired or necessary for the remainder of the circuit. Pilot generator 28 output is coupled through a high-pass filter 29 to a limiter 30, the output of this limiter 30 being coupled to the mixer 21 in a manner to subtract the limited voltages generated by the pilot generator 28 in the mixer from the error signal voltages coming from the limited error amplifier 20. The high-pass filter 29 functions to pass only the higher frequency voltages to the limiter, whereupon the limiter 30 only limits these voltages in amplitude always less than the amplitude of the error signal voltages. In well known systems of this type the voltages generated by the pilot generator 28 are filtered as at 29, and these filtered voltages pass directly to a mixer as 21, which generated voltages often become so high as to reduce the limited error voltages as at 20, to such a low amount as to cause very poor or negative acceleration response in the servo motor to null the error signal voltage. In the present invention the limiter 30 limiting the filtered voltages coming from the pilot generator 28 always to an amplitude lower than the error signal voltages from 20 leaves the error signal voltages predominant in the control of the power amplifier for the servo motor 23. This limited feedback voltage allows more direct signal of error signal voltages to reach the servo motor to control its acceleration and deceleration in nullifying the error signal voltage. A servo system using the limited feedback circuit as disclosed herein has a much better response to error voltages and nullifies the error voltages in a much quicker manner than prior known servo control systems.

Figure 2:
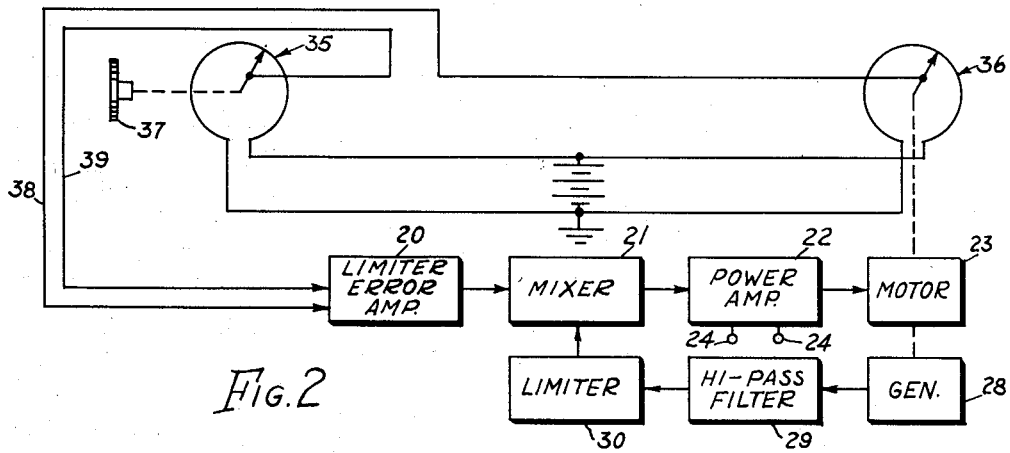
Figure 2 is partially in block and partially in circuit schematic illustrating the invention coupled in an amplifier circuit of a repeater system.

Referring more particularly now to Figure 2 wherein like reference characters refer to like parts, the corrective amplifier system utilizing a limited feedback circuit, as described in Figure 1, may also be applied to a repeater system as, for example, a pair of potentiometers 35 and 36 coupled in a circuit to produce voltages on the adjustable taps thereof. The potentiometer 35 may be considered a transmitter in which the adjustable tap may be mechanically driven by any means for which a rotative angle is desired to be repeated at a remote point, illustrated herein as a handwheel 37. The adjustable tap of the repeater potentiometer 36 may be driven by the servo motor 23 to bring this adjustable tap in voltage correspondence with the adjustable tap of the transmitter 35. The detected error voltages are passed by the conductors 38, 39 to the limited error amplifier 20, which amplified error signals are mixed in the mixer 31 in the same manner as described for the amplifier circuit in Figure 1. The amplitude of the voltage generated by the pilot generator 28 at any instant will always be less than the error signal voltage to cause a predominance of the error signal voltage in controlling the amplified voltage in direction and amplitude passing to the servo motor 23. The servo motor 23 is thereby driven to reduce the error signal voltage on the movable taps of the potentiometers 35 and 36 to zero.

Figure 3:
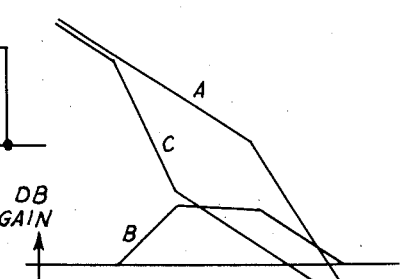
Figure 3 shows a graph of the decibel gain of the amplifier with respect to the log frequency to produce the result applied to the servo motor illustrated in Figures 1 and 2.

Referring to Figure 3, there is shown a graph of the decibel gain relative to the log frequency of the system using the limited feedback network of the invention. The curve A illustrates the gain of the direct loop through the amplifier circuit as it would normally be effective on the servo motor. The curve B illustrates the gain of the feedback loop through the limiter 30, which gain is subtracted from the gain illustrated by the direct loop A to provide the overall gain illustrated by the curve C. When larger amplitudes and rates of input motions occur, the loop limiter suppresses the amplitude of response C to allow the response of B to be greater in the corresponding frequency region of C.

Figure 4:
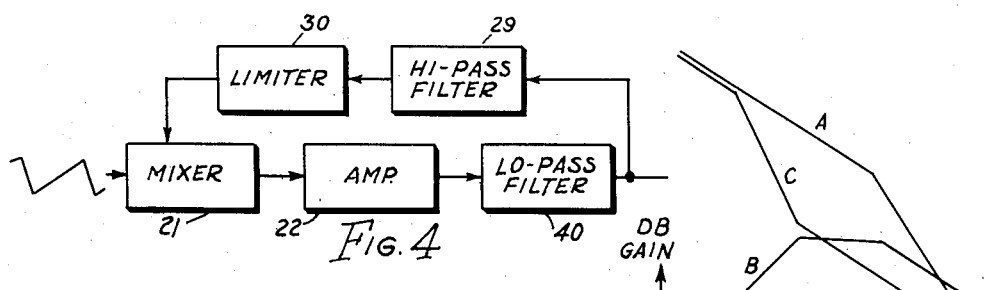
Figure 4 is a block diagram of a simple amplifier circuit with the limited feedback loop for an amplified correction system.

Referring now to Figure 4, there is shown a simple block diagram which may be used in any corrective system, like reference characters referring to like parts, as illustrated in Figure 1. In this figure a sawtooth wave is illustrated as the signal voltage entering the mixer 21, the output of which controls the power amplifier 22 as hereinbefore described. In this modification the output of the power amplifier is passed through a low-pass filter 40 to the point of use. A feedback through the high-pass filter 29 and limiter 30 to the mixer is the same as for the illustrations given in Figures 1 and 2. In this modification none of the stages overload for the known sawtooth wave input, but the loop limiter 30 is adjusted to obtain a more rapid return of the sawtooth wave than could ordinarily be obtained without this limiter. It is conceivable in this modification to obtain returns more rapidly than the input wave and still have negligible oscillatory transients.

Figure 5:
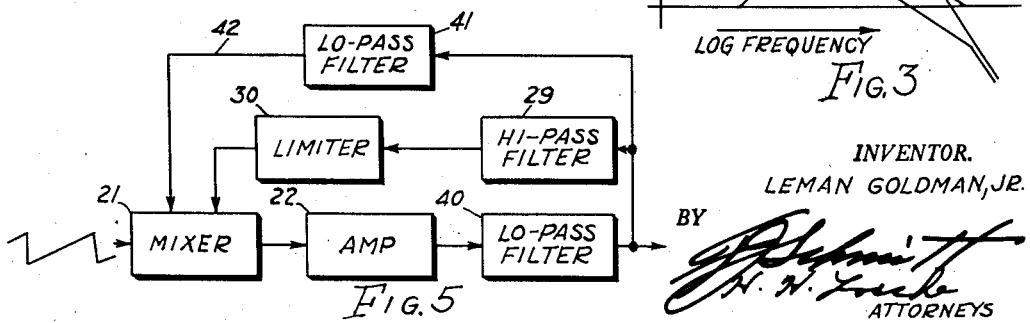
Figure 5 is a block diagram of a circuit similar to Figure 4 further illustrating a low-pass feedback circuit.

Referring more particularly to Figure 5, there is shown a block diagram quite similar to the block diagram of Figure 4 with the exception that a low-pass filter 41 is also coupled in another feedback loop 42 from the output of the low-pass filter 40 to the mixer 21. This non-limited feedback loop 42 may be used for the purpose of reducing low frequency instabilities such as power supply drift. As may be readily understood, the low frequencies are not limited but the high frequencies are limited in this modification.

In the operation of the device, referring to Figure 1 for the purpose of illustration, upon the rotation of the transmitter rotor winding 12 a signal is transmitted from the stator windings 13 of the transmitter 10 to the stator windings 15 of the receiver 11 to induce an error voltage in the receiver rotor winding 16, this error voltage appearing at any time that the rotor 16 is not in electrical correspondence with the rotor 12, as is well understood in the art of servo control systems. This error voltage is limited and amplified in the limited error amplifier 20 and passed through the mixer 21 to control the supply voltage in the power amplifier 22 to the servo motor 23. The servo motor 23 rotates in the direction to rotate the receiver rotor winding 16 toward the null position while at the same time it drives the pilot generator 28 to generate voltages, alternating current or direct current as required, which are fed back through the high-pass filter 29 and limiter 30 to be mixed with the error signal voltages in the mixer 21. The high-pass filter 29 only permits high frequency voltages or high rate of input motion to be passed to the limiter 30, which limiter limits the amplitude of this fed back voltage to less than the amplitude of the error signal voltage coming from 20. Since the error signal voltages are always predominant by reason of limiting the fed back voltages through the limiter 30, the acceleration response of the servo motor 23 is greatly improved for the reason that the predominant signal voltages have good control of the power amplifier 22. By this circuit arrangement incorporating the limiter 30 limiting only the high frequency voltages in a feedback loop, the acceleration response of the servo motor is rapid in rotating the receiver rotor winding 16 to a null position to bring it into electrical correspondence with the transmitter rotor winding 12. In this manner the receiver rotor winding 16 can be made to follow very precisely the movements of the transmitter rotor winding 12 so that little error exists in the transmitter-receiver servo control system 10 and 11. As is well understood in the art, an indicating device or a recording device may be coupled to the mechanical coupling 25 as at 45 to indicate or record the position of the rotatable element 14, herein illustrated as a handwheel. Any rotatable instrument at 14 can therefore be followed precisely in its movements at a remote point.

While many modifications and changes may be made in the constructional details without departing from the spirit and scope of the invention, it is to be understood that I desire to be limited only in the scope of the appended claims.

I claim:

1. A feedback loop of an amplifier circuit comprising, an amplifier circuit having an input for receiving signal voltages to be amplified and an output, means for obtaining output voltages associated with the output of said amplifier circuit, a high-pass filter and a limiter coupling in series said output voltages to the input of said amplifier circuit, said high-pass filter passing only high frequency output voltages and said limiter being constructed and arranged to limit the amplitude of the output voltages of said high-pass filter to a level below the amplitude of said signal voltages, and mixer means in the input of said amplifier circuit for mixing the signal voltages and said limited output voltages.

2. A feedback loop of a follow-up system amplifier circuit having the error signal voltage in the follow-up system transmitted through a mixer to the amplifier circuit and the amplifier controlling the supply voltage to a follow-up motor, the invention which comprises; a generator driven by said follow-up motor; a feedback loop coupling the voltage output of said generator to said mixer; and a high-pass filter and a limiter in series in said feedback loop, said limiter limiting the voltage of said generator to said mixer of an amplitude less than the amplitude of the error signal voltage whereby the error signal voltage for large errors in the follow-up system are directly amplified for follow-up system control.

3. A servo system comprising; a servo transmitter and a servo receiver constituting an error detector detecting the position errors existing between the transmitter and receiver and converts said position errors into error signal voltages; a servo motor for correcting the errors between the transmitter and receiver; means coupling the error signal voltages to drive said servo motor to reduce the error signal voltages to zero; a geneartor of output voltages driven by said servo motor; and a feedback loop from said generator to said means coupling the error signal voltage to drive said servo motor, said feedback loop having a high-pass filter and a limiter for limiting the amplitude of said generated voltages to less than the amplitude of said error signal voltages whereby the error signal voltages remain dominant in the mixed voltages which are amplified and applied directly to said servo motor to produce high acceleration of the servo motor in accordance with the magnitude of the error between the transmitter and receiver of the servo system.

4. A servo system as set forth in claim 3 wherein said means coupling the error signal voltages to drive said servo motor is a limited error amplifier and a mixer operatively coupled to control a power amplifier supplying voltages to said servo motor, and said limited error signal voltages and said generated voltages are coupled to said mixer for subtracting said generated voltages from said limited error signal voltages.

References Cited in the file of this patent

UNITED STATES PATENTS

| | | |
|---|---|---|
| 2,515,249 | McCoy | July 18, 1950 |
| 2,692,358 | Wild | Oct. 19, 1954 |
| 2,758,205 | Lubkin | Aug. 7, 1956 |
| 2,829,329 | Silva | Apr. 1, 1958 |

FOREIGN PATENTS

| | | |
|---|---|---|
| 678,250 | Great Britain | Sept. 3, 1952 |

OTHER REFERENCES

Terman: Electronic and Radio Engineering, fourth edition, McGraw-Hill, 1955, page 619, Fig. 18–1.